Patented June 9, 1936

2,043,238

UNITED STATES PATENT OFFICE 2,043,238

MANUFACTURE OF DI-CALCIUM PHOSPHATE

Harry A. Curtis, Knoxville, Tenn., assignor to Tennessee Valley Authority, Wilson Dam, Ala., a corporation No Drawing. Application July 2, 1934, Serial No. 733,475

6 Claims. (Cl. 23—109)

(Granted under the act of March 3, 1883, as amended April 30, 1928; 370 O. G. 757)

This application is made under the act of April 30, 1928, and the invention herein described, if patented, may be manufactured and used by or for the Government for governmental purposes without the payment to me of any royalty thereon.

This invention relates to the process of manufacture of di-metal phosphates, particularly di-calcium phosphate from calcium carbonate and phosphoric acid.

One of the objects of my invention is to provide a medium for carrying out the final stages of the reactions involved in the formation of di-metal phosphates. Another object of this invention is to provide improved conditions for reaction in the principal steps involved in the manufacture of di-metal phosphates. Still another object of this invention is the manufacture of material of suitable characteristics for incorporation in mineral feed. Other objects of this invention include the manufacture of concentrated fertilizers or concentrated fertilizer ingredients.

Di-calcium phosphate may be prepared by the action of phosphoric acid on limestone, or by the action of phosphoric acid on mineral phosphates as disclosed in my copending application on the Manufacture of calcium phosphates, App. Ser. No. 726,757, filed May 21, 1934.

I have found that by controlling the conditions of reaction for the fine solid chemical materials reactive with phosphoric acid to make di-metal phosphate, a better reaction is obtained. In addition, the resulting product has improved physical properties which make it more suitable for use as a fertilizer or as a concentrated fertilizer ingredient. For instance, fine calcium carbonate is treated with a sufficient amount of phosphoric acid to convert it into mono-calcium phosphate, with the final stage being completed by the admixture of the very fine calcium carbonate which has previously been made into a slurry by the addition of water.

Some of the reactions involved in the manufacture of di-calcium phosphate by steps within the scope of this invention are presented; using calcium carbonate and phosphoric acid:

$$CaCO_3 + 2H_3PO_4 = CaH_4(PO_4)_2 \cdot H_2O + CO_2$$

$$CaH_4(PO_4)_2 \cdot H_2O + CaCO_3 + 2H_2O = 2CaHPO_4 \cdot 2H_2O + CO_2$$

using phosphate rock, phosphoric acid and calcium carbonate:

$$Ca_3(PO_4)_2 + 4H_3PO_4 + 3H_2O = 3CaH_4(PO_4)_2 \cdot H_2O$$

$$CaH_4(PO_4)_2 \cdot H_2O + CaCO_3 + 2H_2O = 2CaHPO_4 \cdot 2H_2O + CO_2$$

One example of the operation of my process is given for the manufacture of di-calcium phosphate from fine limestone and phosphoric acid. Three hundred and two parts by weight of 50 to 100 mesh limestone are mixed with 336 parts by weight of phosphoric acid, containing 87.5% $H_3PO_4$, to form mono-calcium phosphate. Three hundred and two parts by weight of limestone passing through 100 mesh are made into a slurry with 85 parts by weight of water. The mono-calcium phosphate and the limestone slurry are intimately mixed so that the reaction proceeds to the formation of di-calcium phosphate.

Another example of the operation of my process is given for the manufacture of di-calcium phosphate from fine limestone and phosphoric acid. Three hundred and two parts by weight of 100 to 200 mesh limestone are mixed with 336 parts by weight of phosphoric acid, containing 87.5% $H_3PO_4$, to form mono-calcium phosphate. Three hundred and two parts by weight of limestone passing through 200 mesh are made into a slurry with 85 parts by weight of water. The mono-calcium phosphate and the limestone slurry are intimately mixed so that the reaction proceeds to the formation of di-calcium phosphate.

It is evident that there are numerous factors that will influence conditions in the most satisfactory operation of my process, the actual limits of which cannot be established except by a detailed study of each set of raw materials and finished products involved. The fine chemical material which reacts with the phosphoric acid to form mono-calcium phosphate in the first principal step of this process, should be ground so that it will pass through a 50 mesh screen and preferably through a 100 mesh screen. The preparation of the mono-calcium phosphate by the use of phosphoric acid is best accomplished using concentrated acid. The next step in the process consists in making a slurry of a very fine chemical material reactive with the mono-metal phosphate, and is most conveniently effected by using an amount of water which is equivalent to that required to dilute the concentrated acid used in making the mono-metal phosphate to a concentration of 65 to 75% $H_3PO_4$. This second chemical material should be ground to pass through a 100 mesh screen, and in certain instances, as in the case of dolomite, it is preferable to have it pass through a 200 mesh screen. The individual steps in the process may be carried out by suitable means such as previously disclosed in the manufacture of calcium phosphates. The chemical material or mixtures of chemical materials, any one of which may occur as a mineral, which may be used in either the principal steps of this process are limited to those materials that are compatible with other concentrated fertilizer ingredients and compatible with the type of soil upon which it may be used. Calcium, magnesium, manganese, and potassium compounds, particularly the carbonates are suitable for this purpose. The phosphoric acid may be heated to the temperature necessary to cause the proper rate of reaction for the proportions and concentrations of acid used. However, any one or all of the reactants may be heated if desired. The solid reactants may be heated by means especially provided for the purpose or may be obtained in that condition by a preliminary treatment step, such as a drying or roasting process. The ratio of the weights of chemical material used to react with the phosphoric acid to form mono-metal phosphate and the chemical material used to react with the mono-metal phosphate to form the di-metal phosphate will vary, depending on the nature of materials used. Where materials such as limestone or dolomite are used in the preparation of the mono-metal phosphate in the first step and the di-metal phosphate in the second step, equal parts of these materials will be used in each step. If, however, material such as limestone is used in the first step to make the mono-metal phosphate and dolomite is used in the next step to make the di-metal phosphate, then these materials will be used substantially in their stoichiometric ratios. The phosphoric acid is likewise used in amounts sufficient only to form the mono-metal phosphate, without leaving an excess of free acid.

Certain terms used throughout the discussion and claims are understood to have the following meaning: the chemical materials reactive with phosphoric acid to form mono-metal phosphate and chemical materials reactive with mono-metal phosphate to form di-metal phosphate refer to crude materials such as minerals and materials of high as well as intermediate states of purity, as well as compounds and mixtures of the same; slurry refers to a mixture of fine chemical material with only the amount of water included which is substantially equivalent to that required for the water of hydration of the product and concentrated acid refers to strong but not necessarily anhydrous material, with the concentration preferred being 65% or greater.

I claim:

1. Process of making di-calcium phosphate from limestone and concentrated phosphoric acid, containing at least 65% by weight of $H_3PO_4$, which comprises, separating the ground limestone into a coarser fraction and a finer fraction; reacting the coarser limestone fraction and a sufficient quantity of the concentrated phosphoric acid to form mono-calcium phosphate; making a slurry of the finer limestone fraction in water, the amount of water used being substantially equivalent to that required for the hydration of the di-calcium phosphate subsequently produced; and contacting the mono-calcium phosphate and the slurry of the fine limestone to produce di-calcium phosphate.

2. Process of making di-calcium phosphate from fine limestone, fine dolomite and concentrated phosphoric acid, containing at least 65% by weight of $H_3PO_4$, which comprises, reacting the fine limestone and a sufficient quantity of the concentrated phosphoric acid to form mono-calcium phosphate; making a slurry of the fine dolomite and water, the amount of water used being substantially equivalent for that required for the hydration of the calcium phosphate subsequently produced; and contacting the mono-calcium phosphate and the slurry of the fine dolomite to produce di-calcium phosphate.

3. Process of making di-calcium phosphate from phosphate rock and concentrated phosphoric acid, containing at least 65% by weight of $H_3PO_4$, which comprises, reacting the fine phosphate rock with a sufficient quantity of the concentrated phosphoric acid to form mono-calcium phosphate; making a slurry of fine limestone in water, the amount of the water used being substantially equivalent to that required for the hydration of the di-calcium phosphate subsequently produced; and contacting the mono-calcium phosphate and the slurry of the fine limestone to produce di-calcium phosphate.

4. Process of making di-calcium phosphate from fine phosphate rock, fine dolomite and concentrated phosphoric acid, containing at least 65% by weight of $H_3PO_4$, which comprises, reacting the fine phosphate rock with a sufficient quantity of the concentrated phosphoric acid to form mono-calcium phosphate; making a slurry of the fine dolomite and water, the amount of water used being substantially equivalent for that required for the hydration of the calcium phosphate subsequently produced; and contacting the mono-calcium phosphate and the slurry of the fine dolomite to produce di-calcium phosphate.

5. Process of making di-calcium phosphate from a calcium compound, rich in calcium carbonate and reactive with concentrated phosphoric acid, containing at least 65% by weight of $H_3PO_4$, to form mono-calcium phosphate and the concentrated phosphoric acid, which comprises, separating the ground calcium compound into a coarser fraction and a finer fraction; reacting the coarser calcium compound fraction and a sufficient quantity of the concentrated phosphoric acid to form mono-calcium phosphate; making a slurry of the finer calcium compound fraction in water, the amount of the water used being substantially equivalent to that required for the hydration of the di-calcium phosphate subsequently produced; and contacting the mono-calcium phosphate and the slurry of the finer calcium compound fraction to produce di-calcium phosphate.

6. Process of making di-calcium phosphate from a calcium compound, reactive with concentrated phosphoric acid, containing at least 65% by weight of $H_3PO_4$, to form mono-calcium phosphate, and the concentrated phosphoric acid which comprises, reacting the fine calcium compound with a sufficient quantity of the concentrated phosphoric acid to form the mono-calcium phosphate; making a slurry of a fine calcium compound, rich in calcium carbonate, and water, the amount of water used being substantially equivalent to that required for the hydration of the di-calcium phosphate subsequently produced; and contacting the mono-calcium phosphate and the slurry of the fine calcium compound, rich in calcium carbonate, to produce di-calcium phosphate.

HARRY A. CURTIS.